United States Patent Office 2,949,567
Patented Aug. 16, 1960

2,949,567
PHASE INTERLOCK FOR SERIES CAPACITOR

Floyd D. Johnson, Forest Hills, Pa., assignor to Westinghouse Electric Corporation, East Pittsburgh, Pa., a corporation of Pennsylvania Filed Oct. 31, 1956, Ser. No. 619,581

4 Claims. (Cl. 317—12)

The present invention relates to series capacitor installations in alternating current lines and, more particularly, to a protective system for series capacitors installed in high voltage, synchronous, alternating current transmission lines where system stability is a primary or limiting consideration in the operation of the line.

Capacitors are connected in series in alternating current transmission or distribution lines to neutralize part or all of the inductive reactance of the line in order to raise the stability limit or the power limit of the transmission line or to improve the voltage regulation of a distribution line. Since such capacitors are connected in series in the line to carry the line current, the voltage of the capacitor is proportional to the line current and in case of a fault on a line the voltage across the capacitor may rise to many times its normal value. Standard capacitor units, such as are used in series capacitor installations, are capable of withstanding overvoltages of the order of 150% of their normal rated voltages for brief periods or somewhat higher voltages momentarily, but they cannot be subjected to voltages in excess of about 250% to 300% of normal voltage even momentarily without the probability of damage.

It is not practical to utilize capacitors which are capable of withstanding the maximum voltage to which they may be subjected under fault conditions, because of the excessive cost, since the cost of a capacitor increases approximately as the square of the voltage for which it is designed. A series capacitor installation, therefore, usually consists of capacitor units having a voltage rating determined on the basis of the normal voltage across the capacitor together with a protective system for bypassing the capacitor under fault conditions or other excess current conditions in order to protect the capacitor against overvoltage. In order to adequately protect the capacitor the protective system must operate to bypass it substantially instantaneously upon the occurrence of an overvoltage of predetermined magnitude, that is, the capacitor must be effectively bypassed within the first half-cycle of fault current. Because of this requirement of substantially instantaneous operation, spark gaps are usually used in these protective systems, since no switch, or other device involving moving parts or mechanical movement, could operate fast enough.

When a series capacitor is installed in a high voltage transmission line with the primary purpose of raising the stability limit to increase the amount of power that can be transmitted over the line, the problem of protection is especially difficult. This is for the reason that since the capacitor must be effectively bypassed upon the occurrence of an overvoltage, it is removed from service during the fault. In order for the capacitor to be of use for its intended purpose, however, the capacitor must be restored to service substantially instantaneously when the fault is cleared so as to be avaailable to assist in maintaining stability during the critical transient conditions immediately following the clearing of the fault, and especially in the first few cycles after the fault is cleared when the stability conditions are most critical. The protective system for the series capacitor must therefore operate not only to bypass the capacitor substantially instantaneously upon the occurrence of a predetermined overvoltage across the capacitor, but also to remove the bypass and restore the capacitor to service substantially instantaneously when the fault is cleared and the line current returns to or near the normal value. A protective system capable of operation in this manner is disclosed and claimed in patents to R. E. Marbury No. 2,576,132, issued November 27, 1951, and to F. D. Johnson, Patent No. 2,584,710, issued February 5, 1952, both assigned to Westinghouse Electric Corporation. The Marbury and Johnson patents disclose an electropneumatic system in which the capacitor is protected by a spark gap device which is connected across the capacitor and which is made self-clearing by a blast of air from a compressed air tank. The system includes a bypass switch biased to closed position but normally held in open position by air pressure, and means are provided for releasing the air pressure to allow the switch to close in response to the occurrence of certain abnormal conditions, including continued arcing of the spark gap device for more than a predetermined time and the occurrence of a sustained overvoltage across the capacitor of a lower magnitude than the breakdown voltage of the gap.

On three-phase lines the system disclosed in the above mentioned prior patents causes the closing of the bypass switch only on the phase or phases subjected to these abnormal conditions. The shorting of the series capacitor on one or two phases only causes an unbalance of the line voltages, with the result that the phase sequence relays for ground detection function to unnecessarily open the line circuit breakers.

The principal object of the present invention is to provide an improved protective system of this type for series capacitors in three-phase high voltage transmission lines which operates so that closing of the bypass switch of one or two phases due to predetermined abnormal conditions will result in the closing of the corresponding switches on the other phase or phases.

Another object of the invention is to provide an improved protective system for series capacitors for three-phase high voltage transmission lines in which the capacitor is protected by a bypass switch which is biased to closed position but normally held open by air pressure in a pneumatic cylinder and in which means are provided for exhausting air from the cylinder on all three phases upon the occurrence of predetermined abnormal conditions to permit the bypass switches to close.

A further object of the invention is to provide a protective system for series capacitors in three-phase high voltage transmission lines in which the capacitor is protected by a bypass switch on each phase which is normally held open by means of air pressure in a pneumatic cylinder. Electropneumatic control means are provided for exhausting the air from the cylinder upon the occurrence of certain abnormal conditions to permit the bypass switch to close, and pneumatic interlock means are provided for actuating the electropneumatic control means on the remaining phases when these abnormal conditions occur on one or two phases only.

Other objects and advantages of the invention will be apparent from the following detailed description, taken in connection with the accompanying drawings, in which.

Figure 1:
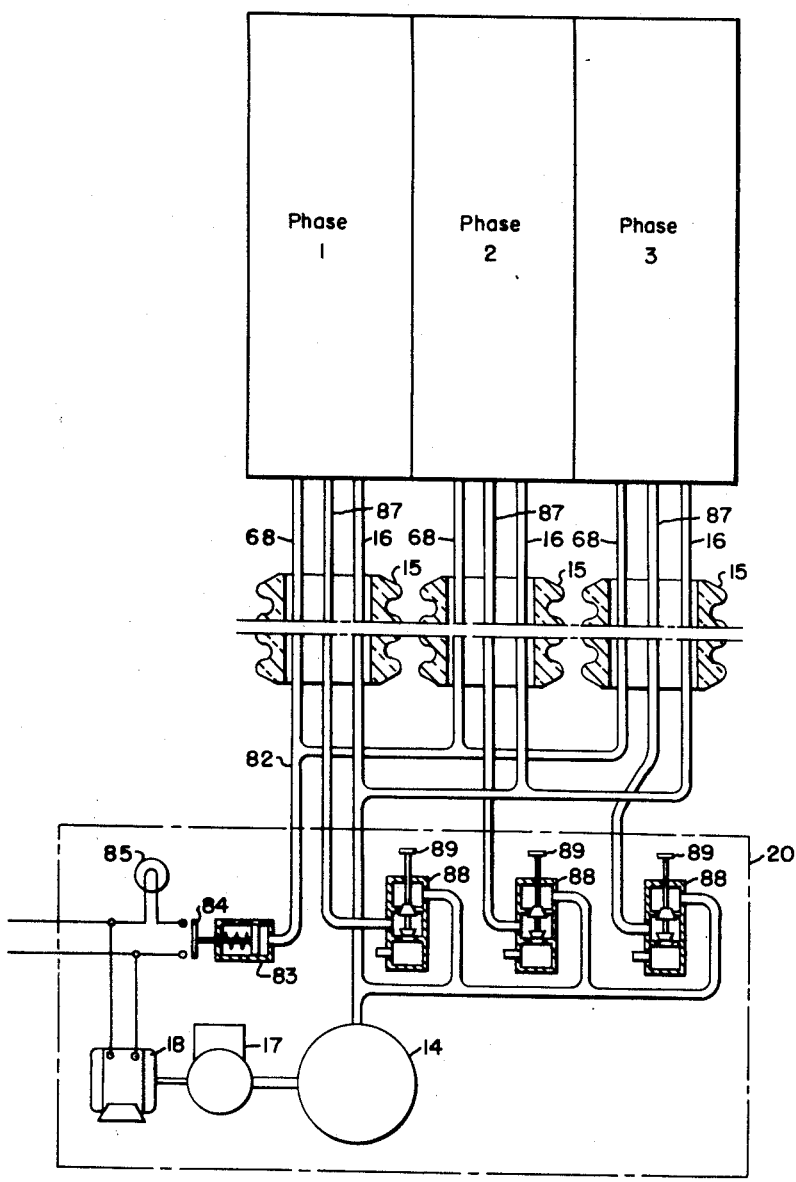
Figure 1 is a block diagram showing a series capacitor protective system for a three phase installation.
Figure 2:
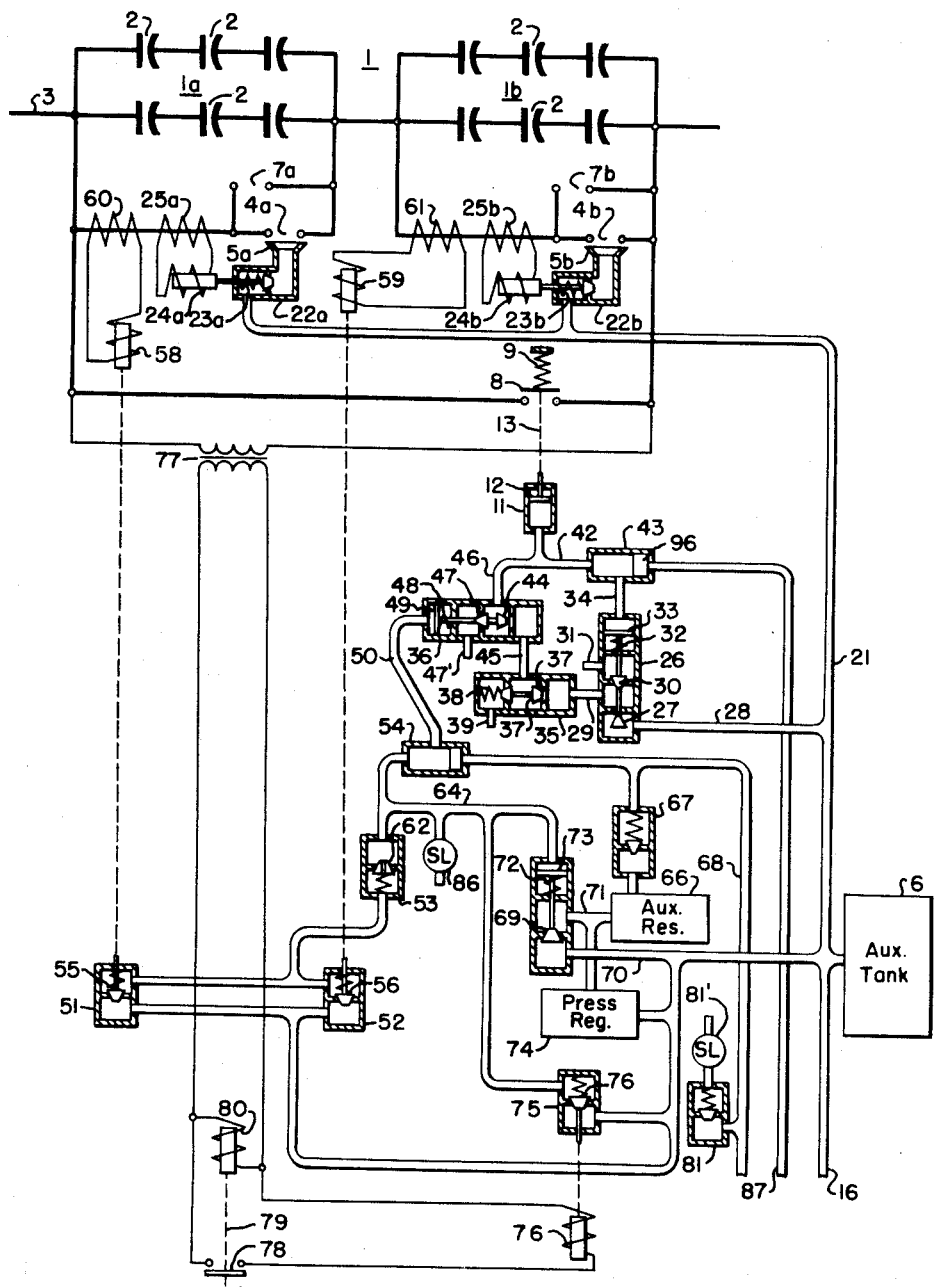
Fig. 2 is a schematic diagram showing a preferred embodiment of the invention showing details of the system on one phase.
Figure 3:
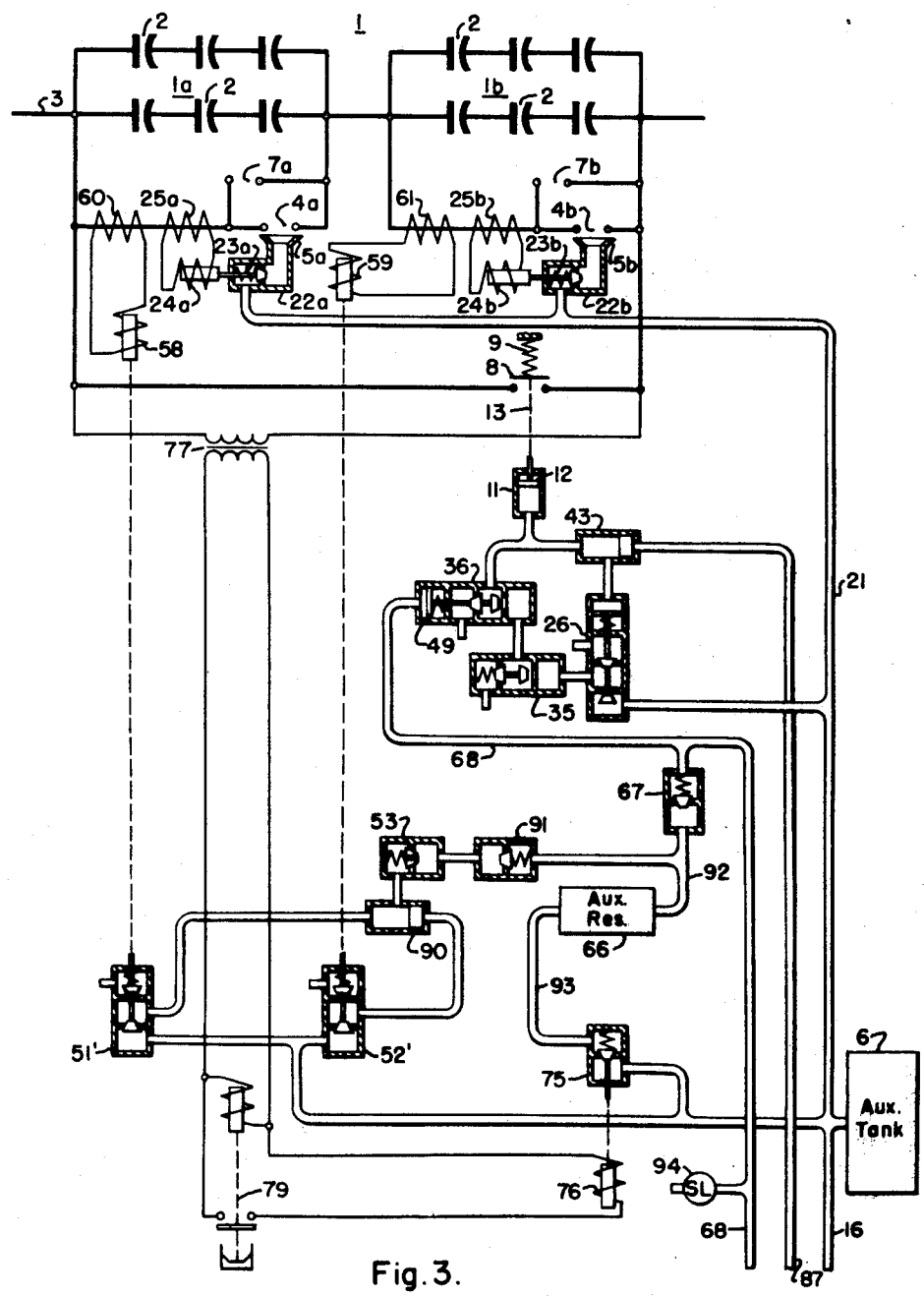
Fig. 3 is a schematic diagram showing a modified embodiment of the invention.
Figure 4:
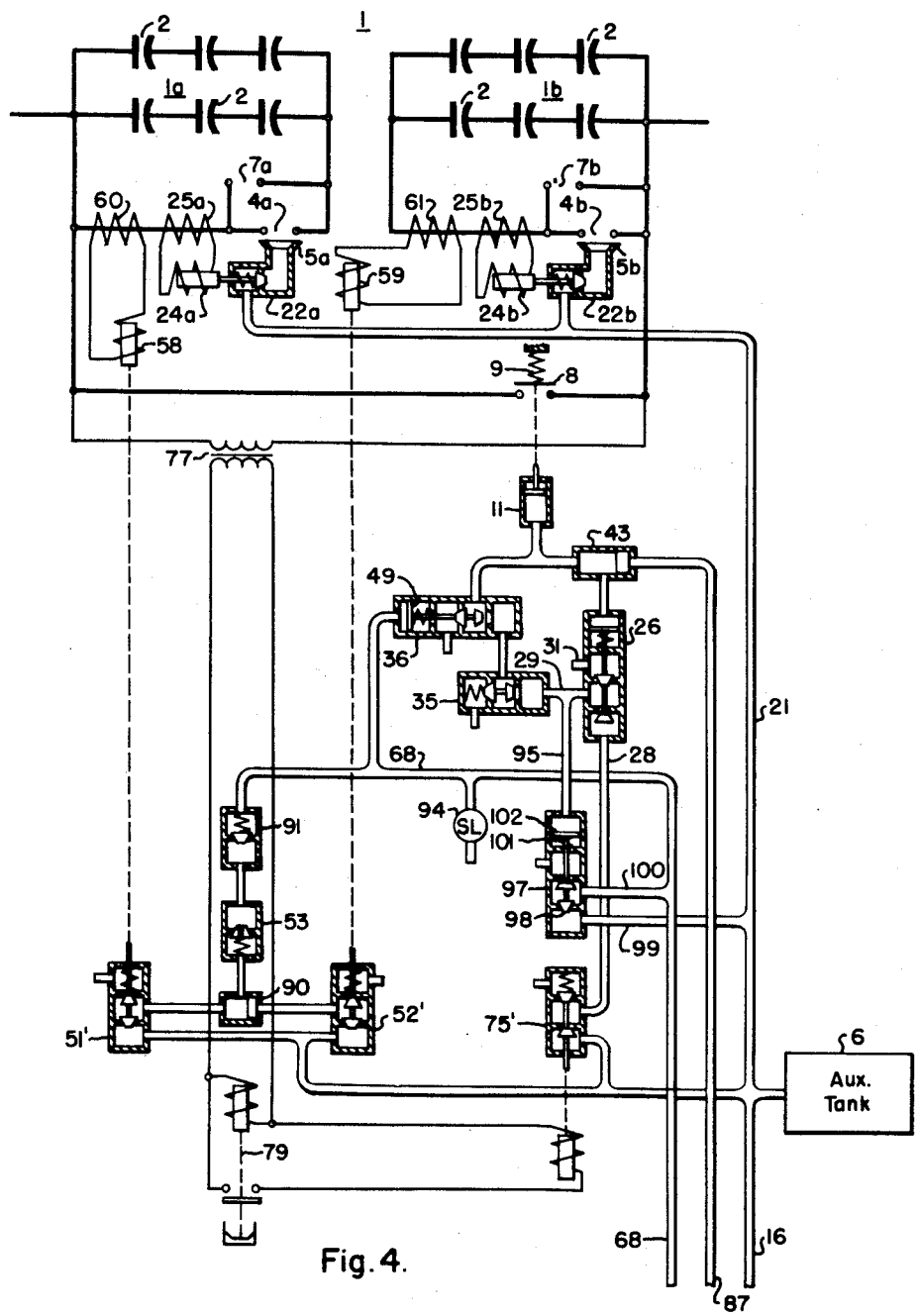
Fig. 4 is a schematic diagram showing still another embodiment of the invention.

In Fig. 1 of the drawings is shown a diagrammatic disclosure of the series capacitor installation of this invention wherein the blocks designated, phase 1, phase 2 and phase 3 indicate the series capacitors and their associated electropneumatic protective system for each of the respective phases. The compressor 17, motor 18, main air tank 14 and reset valves 88 together with their connecting conduits and housing 20 are shown in detail in Fig. 1 as are the supply, interlock and reset conduits leading to their respective phases. The elements within housing 20 are common to all three phases and will be hereinafter more fully described. Various modifications of the protective system included in each of the blocks, phase 1, phase 2 and phase 3, are shown in Figs. 2, 3 and 4. In order to avoid unnecessarily complicated drawings one phase is shown in detail in Figs. 2, 3 and 4. The other two phases are identical in all details to the phase shown. Since all three phases are identical, only one will be described.

Fig. 2 of the drawings, shows a protective system for a series capacitor 1 comprising two capacitor banks 1a and 1b connected in series and installed in a three-phase alternating current line 3. Each of the banks 1a and 1b comprise a plurality of capacitors 2 in a series-parallel arrangement. The series capacitor 1 is installed for the purpose of raising the stability limit and thus increasing the amount of power that can be transmitted over the line. The term "series capacitor" or "capacitor" as used hereinafter is to be understood as including any necessary number of individual capacitor units and capacitor banks connected in series and the capacitor units 2 shown in the drawings are representative of any necessary number of individual capacitor units, a relatively large number of parallel connected units normally being used. The series capacitor 1 is protected against overvoltages resulting from faults or other excessive current conditions of line 3 by means of main spark gap devices 4a and 4b connected across each of the capacitor banks 1a and 1b. The spark gap devices 4a and 4b preferably have massive carbon electrodes so as to be capable of sustaining continuing arcing for a reasonable time without damage, and are preferably of the type disclosed in the patent to R. E. Marbury No. 2,660,693, issued November 24, 1953, assigned to Westinghouse Electric Corporation, although any suitable construction might be used. The gap devices 4a and 4b are made self-clearing by means of an air blast directed into the gap through a nozzle 5a or 5b from a compressed air tank 6.

Backup spark gap devices 7a and 7b, which may be of any suitable construction, are connected across each of the main gap devices 4a and 4b. The backup devices 7a and 7b are intended to operate to protect the capacitor if the main gaps 4a and 4b fail to operate for any reason, and the backup gaps 7a and 7b are therefore set to have a somewhat higher breakdown voltage than the main gaps 4a and 4b so that they operate only if the main gap does not. Thus each of the main gaps 4a and 4b may be set for a breakdown voltage equal to about 250% of the normal voltage across the capacitor with which it is associated, which is the maximum voltage that should be permitted to occur across the capacitor, while the backup gaps 7a and 7b may be set for a breakdown voltage of about 300% of the normal voltage, so that they will operate to protect the capacitor if the main gaps 4a and 4b fail to operate. A single bypass switch 8 is connected across both of the capacitor banks 1a and 1b, in parallel with the respective gap devices 4a, 4b and 7a, 7b for bypassing the capacitor upon the occurrence of certain abnormal conditions. The bypass switch 8 is biased to closed position by means of a spring 9 or other suitable biasing means and is provided with a pneumatic cylinder 11 containing the piston 12 which is connected to the switch 8 by a link 13 or in any other suitable manner. The bypass switch 8 is thus biased to closed position but is normally held in open position by means of air pressure admitted to the cylinder 11 from the air tank 6.

The electropneumatic system for controlling the air blast through the main gaps 4a and 4b and for effecting operation of the bypass switch 8 includes a main compressed air tank 14 (Fig. 1) and the auxiliary compressed air tank 6 mentioned above. The gap devices 4a, 4b and 7a, 7b and the bypass switch 8, and their associated equipment must, of course, be insulated from ground for the full line voltage, and since the voltage may be quite high, of the order of 230 kilovolts, for example, in the type of transmission system for which the invention is particularly intended, this means that the gap devices and switch are necessarily spaced a considerable distance from any apparatus at ground potential. The air supply from which the air blast is obtained must be closely adjacent the main gaps 4a and 4b, in order to avoid the delay incident bringing the air from a relatively distant tank at ground potential, and it must be adequate to maintain the air blast as long as the gaps 4a and 4b continue to arc. For this purpose, the auxiliary air tank 6 is utilized, and it is mounted closely adjacent the gaps 4a and 4b and insulated from ground. The tank 6 is mounted above a column of hollow insulators 15 (Fig. 1) through which an insulating conduit 16 extends to the main air tank 14 which is at ground potential. The physical structure and arrangement of the insulator column 15 and the auxiliary air tank 6 may be as shown and described in the last mentioned Marbury patent referred to above except that three insulating conduits or air lines are carried in the insulator column as described hereinafter.

The main air tank 14 is supplied with air by means of a compressor 17 driven by a motor 18 supplied from any suitable low voltage power source (see Fig. 1). The compressor 17 and motor 18 are controlled automatically in any suitable manner to maintain a desired air pressure, such as 250 pounds per square inch, in the main tank 14 and the main tank 14 is connected through the insulating conduit 16 to supply air to the auxiliary air tank 6. Pressure in the auxiliary air tank 6 is preferably maintained at a somewhat lower value, such as 150 pounds per square inch, by means of a suitable pressure regulator (not shown) or other means. With this arrangement an adequate supply of compressed air for the air blast and for switch 8 is placed closely adjacent these devices and insulated from ground, but the main air tank with its compressor and driving motor can be located at any suitable or convenient remote point and need not be insulated from ground. The main air tank and compressor with their associated control equipment are preferably placed in the housing indicated at 20 which may be located at any convenient place and the single main air tank 14 may be utilized to supply the three individual auxiliary air tanks 6 for the three phases of a three-phase installation.

The air blast is supplied to the main gap devices 4a and 4b from the auxiliary air tank 6 through a conduit 21 and is controlled by means of valve devices 22a and 22b, respectively. The blast valves 22a and 22b may be pilot operated valves to obtain rapid reliable operation, but for simplicity they are shown as single valves which are normally held closed by a spring 23a or 23b respectively or other biasing means. The blast valves 22a and 22b are operated by solenoids 24a and 24b which are energized in response to flow of current in the circuit of the gap devices 4a or 4b and 7a or 7b by means of current transformers 25a and 25b. It will be apparent that when either of the gap devices 4a, 4b or 7a, 7b break down and current starts to flow in the gap circuit the blast valve 22a or 22b will be opened to direct a blast of air through the main gap device 4a or 4b.

As described above, the bypass switch 8 is normally held in open position by air pressure in the cylinder 11. Air is supplied to the cylinder 11 from the auxiliary air tank 6 through a main valve device 26. The main valve 26 has a valve element 27 which connects the valve inlet 28 to the outlet 29 when the valve is in the open position shown, and a valve element 30 which connects the outlet 29 to an exhaust opening 31 when the valve is in closed position. The main valve 26 is biased to closed position by means of a spring 32 and is provided with a diaphragm or piston 33. The valve 26 is normally held in the open position, shown in the drawings, by means of air pressure admitted to the diaphragm 33 through a conduit 34 so that air is normally allowed to pass through the valve 26 to the cylinder 11.

Air flowing through the valve 26 from the inlet 28 to the outlet 29 passes through a pressure valve 35 and a first control valve 36 and then into cylinder 11. The pressure valve 35 is shown as having a valve element 37 which is biased toward closed position by a spring 38 but which is normally held open by pressure of the air passing through the valve. If the air pressure is sufficiently reduced, however, the spring 38 closes the valve 35 to cut off the flow of air and opens an exhaust opening 39 whereby cylinder 11 is rapidly exhausted resulting in the rapid closing of bypass switch 8. Thus, loss of air pressure in the system will actuate bypass switch 8 to closed position.

The control valve 36 has a valve element 44 which connects the valve inlet 45 to the outlet 46 when the valve is in the open position shown, and a valve element 47 which connects the valve outlet 46 to the exhaust opening 47' when the valve is in closed position. The control valve 36 is biased to open position by means of a spring 48 and is provided with a diaphragm or piston 49. The valve 36 is actuated to closed position upon the occurrence of certain predetermined abnormal conditions by means of air pressure admitted to the diaphragm 49 through a conduit 50. Under normal operating conditions valve 36 is in open position so that air is normally allowed to pass through the valve 36 to the cylinder 11. A branch conduit 42 is provided for supplying air to the conduit 34 through a check valve 43. Under normal conditions, therefore, the parts are held in the position shown by air pressure admitted through the inlet 28, valve 26, pressure valve 35 and conduit 45 to control valve 36 through outlet opening 46 to the cylinder 11 and into the diaphragm 33.

Air is admitted to control valve diaphragm 49 from the auxiliary air tank 6 through either or both of solenoid operated auxiliary control valves 51 or 52 through throttle valve 53 and check valve 54. Auxiliary control valves 51 and 52 are disposed in parallel between the air tank 6 and the throttle valve 53. Auxiliary control valves 51 and 52 are normally held in closed position shown by means of springs 55 and 56 respectively and in this position prevent air from flowing from the tank 6 to the diaphragm 49. Solenoid 58 of auxiliary control valve 51 and solenoid 59 of auxiliary control valve 52 are energized in response to flow of current in the circuit of the gap devices 4a, 4b or 7a, 7b by means of current transformers 60 and 61. When energized, the solenoids 58 and 59 open the valves 51 and 52 to admit air from the tank 6 to the diaphragm 49 of control valve 36 through throttle valve 53. The throttle valve 53 is designed to throttle air flowing through it toward the control valve 36. Valve 53 is shown as having a small throttling orifice 62 but any suitable type of throttle valve may be used. The purpose of a throttle valve here is to delay the operation of valve 36 in order to prevent closing of the bypass switch during momentary arcing across the gaps 4a or 4b. It will be seen that if solenoid 58 or 59 is energized, the valve 36 will close after a time delay introduced by the throttle valve 53. Therefore it can be seen that continuous arcing of the gap associated with either the capacitor bank 1a or the capacitor bank 1b will cause the control valve 36 to close, thereupon exhausting the air from cylinder 11 and diaphragm 33 through exhaust port 47', thereby closing the bypass switch 8.

A branch conduit 64 leads from throttle valve 53 to an interlock control valve 65. Interlock control valve 65 is normally closed. In the open position, however, air is admitted from tank 6 through valve 65 to a precharged auxiliary reservoir 66, thence through a check valve 67 to an interlock conduit 68. The interlock conduits of the three phases are connected together. Interlock conduit 68 leads through check valve 54 to diaphragm 49 of control valve 36 on each phase. When sufficient air pressure is admitted to interlock conduit 68, control valve 36 on each phase is actuated to closed position. Interlock control valve 65 is shown as having a valve element 69 which connects the valve inlet 70 to the valve outlet 71 when the valve is in the open position. The interlock valve 65 is biased to closed position by means of a spring 72 and is provided with a diaphram or piston 73. The valve 65 is actuated to open position by means of air pressure admitted to the diaphragm 73 through branch conduit 64. Air is also admitted to auxiliary reservoir 66 from air tank 6 through a pressure reducing valve 74 which is so regulated as to maintain pressure in auxiliary reservoir 66 and consequently interlock conduit 68 at a pressure below the pressure required to actuate control valve 36 but sufficient to produce rapid action when additional air is admitted through interlock control valve 65. Interlock control valve 65 is a fast opening, delayed closing valve. The delayed closing of valve 65 is achieved by reason of trapped air between diaphragm 49, check valve 53 and diaphragm 73. The air pressure is slowly relieved through slow leak 86 in branch conduit 64. Although auxiliary control valves 51 and 52 will reclose when the bypass switch is closed, causing the reclosing of interlock control valve 65, sufficient pressure will be accumulated in auxiliary reservoir 66 to operate control valves 36 on the remaining phases where the respective valves 51 and 52 have not been actuated.

A third solenoid operated auxiliary control valve 75, which is normally held in closed position as shown by means of a spring 76, is interposed between auxiliary air tank 6 and branch conduit 64. The valve 75 is operated by a solenoid 76 and when the valve 75 is moved to open position by energization of the solenoid, air is admitted from air tank 6 to the diaphragm 49 of valve 36 and the diaphragm 73 of valve 65. This results in closing of valve 36 and opening of interlock control valve 65. The valve 75 is operated in response to overvoltage across the series capacitor by means of a potential transformer 77 which is connected directly across the capacitor. Energization of the solenoid 76 is controlled by a voltage relay 79 which has its operating coil 80 connected across the secondary of the potential transformer 77 and its contact 78 connected as shown to connect the solenoid 76 across the transformer 77 when the contact closes. The relay 79 is provided with suitable time delay means as indicated diagrammatically by a dashpot.

The auxiliary reservoir 66 is held in a precharged condition at partial pressure so that less time is required to trip either its own or other phases. This precharge is controlled by pressure reducing valve 74. Should the precharge pressure of auxiliary reservoir gradually rise due to imperfect operation of the pressure reducing valve 74 constant leakage of air may occur through slow leak valve 86, the function of which is more fully described hereinafter. Also sufficient pressure may build up in the auxiliary reservoir to actuate valve 36 prematurely. Constant drainage of the precharge and premature closing of valve 36 is prevented by pop-off valve 81 which is set at a pressure just below minimum pressure to operate control valve 36 and just above maximum pressure on the low side of pressure reducing valve 74. For example, if it were desired to precharge auxiliary reservoir 66 to 60 p.s.i. and if valve 36 set to close with 70 p.s.i. on diaphragm 49 then pop-off valve 81 would be set to open at 65 p.s.i. A slow leak valve 81' may be provided in the exhaust port of pop-off valve 81 to prevent loss of pressure when the interlock line is charged by operation of auxiliary control valves 51, 52 or 75.

Charging of the auxiliary reservoir 66 is accomplished by interlock control valve 65 using the same air pressure as is used to actuate control valve 36. The delayed action in closing of valve 65 will assure that the auxiliary reservoir will be charged to the point of actuating the other phases where the trouble has not originated. Check valve 67 prevents charging of the auxiliary reservoirs 66 of the phases where the trouble has not originated (Fig. 1).

The sequence of events can originate on any one or more than one phase and thereby all phase capacitors will be shorted out. A branch conduit 82 from interlock line 68 leads to a pressure switch 83. When sufficient pressure is admitted to the interlock line to operate control valve 36, the pressure in branch conduit 82 is sufficient to operate the pressure switch 83 which closes its contact 84 which is connected to complete a circuit to a signal lamp 85, or other suitable signal or indicating devices which may be either visual or audible, to indicate the operation of the closing of the bypass switch.

It will be seen that prolonged arcing of the gaps 4a and 4b or sustained moderate overvoltage on the capacitor 1 will cause the bypass switch 8 to close and that it will then remain closed until the main valve 26 is reopened. Before the main valve 26 can be reopened air pressure which has become locked between the diaphragm 49 of first control valve 36 and the diaphragm 73 of interlock control valve 65 must be released. For this purpose a slow leak throttle valve 86 is provided in branch conduit 64. When valves 51, 52, or 75 have reclosed upon the closing of bypass switch 8, pressure on diaphragms 49 and 73 is relieved permitting valve 36 to return to its normal open position and permitting valve 65 to return to its normal closed position.

Thereupon main valve 26 can be reopened by remote manual means which operates to admit air to the diaphragm 33 through the check valve 43. The check valve 43 is shown as having a movable piston or valve element 96 which is normally in the position shown to connect the conduit 42 to the conduit 34. When air pressure is admitted to the opposite side of the check valve 43, however, the piston 96 is free to move to the opposite end to allow air to flow from the right-hand side of the check valve to the conduit 34. Air is supplied to diaphragm 33 of valve 26 directly from the main air tank 14 by means of an insulating conduit 87 which passes through the insulator column 15 and is connected to the check valve 43. A control valve 88 is provided which may conveniently be located in the compressor housing 20 and which is usually manually operated by a pushbutton 89 or in any other suitable manner. When the pushbutton 89 is actuated, air flows directly from the main tank 14 through the conduit 87 to the check valve 43 and through the conduit 34 to the diaphragm 33 of the valve 26, the valve element 96 moving to the left. The air pressure thus applied to the diaphragm 33 moves the valve 26 to open position and allows air to flow from the inlet 28 to the pressure switch 35 which is opened by the air pressure to allow air to flow through control valve 36 to the cylinder 11 to open the switch 8. The air flowing to the cylinder 11 also flows into the conduit 42 and as soon as the pushbutton 89 is released and the air pressure in the conduit 87 drops, the valve element 96 is moved back to the right to admit air from the conduit 42 to the diaphragm 33 to hold the valve 26 in open position. Thus it will be seen that switch 8 is reopened merely by actuating the pushbutton 89 and holding it momentarily until the air pressure has built up sufficiently in the conduit 42 to hold the valve 26 open. Since the valve 88 is insulated from the high voltage equipment by the insulating conduit 87 it can safely be operated manually and can be disposed at any convenient remote location.

In Fig. 3 of the drawings is shown an alternative arrangement which is similar to the protective system disclosed in Fig. 2, but for the sake of economy and simplicity eliminates the auxiliary reservoir precharging system. Thus elements of the system shown in Fig. 3, which are the same as Fig. 2, are identified by the same reference numerals.

In this embodiment of the invention, air is admitted from the auxiliary air tank 6 through main valves 26, pressure valve 35 and normally open control valve 36 to the cylinder 11 to hold the bypass switch 8 open. Air is admitted to control valve diaphragm 49 from auxiliary air tank 6 through one of the normally closed, solenoid operated, auxiliary control valves 51', 52' or 75 through check valve 67 by way of interlock conduit 68. Auxiliary control valves 51' and 52' in this modification differ from corresponding valves 51 and 52 of the Fig. 2 embodiment in that exhaust ports are provided to permit escape of air trapped between check valves 91 and 51' or 52'. Air admitted to diaphragm 49 through auxiliary control valve 51' or 52' passes through a three-way check valve 90, throttle valve 53, and check valve 91. A branch conduit 92 between check valves 67 and 91 extends to auxiliary reservoir 66. Conduit 93 extends from the auxiliary reservoir 66 to the supply line. Auxiliary control valve 75 is interposed in conduit 93 between the auxiliary reservoir 66 and the auxiliary tank 6.

Thus it can be seen that upon opening of any of the valves 51', 52' or 75, air is supplied to the auxiliary reservoir 66. Valves 51', 52' and 75 are instantly reclosed as soon as the associated switch 8 closes. Prior to their reclosing, a supply of compressed air is built up in the auxiliary reservoir 66 and hence the switch 8 of the other phases will close after the initiating valve has opened and reclosed. The auxiliary reservoirs 66 of the phases other than that on which the trouble originated will not be charged. This is prevented by check valve 67. Check valve 91 prevents passage of air from the auxiliary reservoir to the exhaust of valves 51' and 52'. Throttle valve 53 serves to delay operation of control valve 36 to prevent closing of the bypass switch during transient arcing. A time delay relay 79 is provided to effect operation of auxiliary control valve 75 as previously described. Slow leak 94 in the interlock conduit 68 as shown in the drawings provides a means for exhausting the interlock circuit which is necessary before switches 8 can be opened. Any other suitable means can be provided for this purpose.

Another alternative system is shown in Fig. 4 which eliminates entirely the auxiliary reservoir. The system is substantially identical to the system shown in Fig. 3 and described above. In this embodiment, auxiliary control valve 75' is normally open and is connected directly between the auxiliary tank 6 and inlet 28 of the main valve 26. Valve 75' is provided with an exhaust port, thus differing from corresponding valve 75. Therefore accumulated air in valve inlet conduit 28 can be exhausted upon closing of valve 75'. Auxiliary control valves 51' and 52' are connected to the interlock conduit and to the diaphragm 49 of control valve 36 just as shown in Fig. 2, omitting only the auxiliary reservoir and the branch conduit leading thereto. Thus, upon the occurrence of the aforementioned abnormal conditions, the main valve 26 will ultimately be closed and cylinder 11 will be exhausted resulting in the closing of bypass switch 8.

To close bypass switch 8 on the phases where the trouble did not originate, means are provided to introduce compressed air into the interlock conduit 68 which operates control valve 36 as in the previously described embodiments. To accomplish this, a signal line 95 is connected at one end to the diaphragm of a normally closed piston or diaphragm operated valve device 97. At its other end, the signal line is connected to outlet 29 of main valve 26 between main valve 26 and pressure valve 35. Air flowing from auxiliary tank 6 through main valve 26 will maintain air pressure in signal line 95. The valve device 97 illustrated has a valve element 98 which connects the valve inlet 99 to the outlet 100 when the valve is in the open position. Inlet 99 is connected to the air reservoir 14 and outlet 100 is connected to the interlock conduit 68. The valve device 97 is biased to the open position by means of a spring 101 and is provided with a diaphragm or piston 102. The valve device 97 is normally held in the closed position shown in the drawings by means of the air pressure admitted to the diaphragm 102 through signal line 95 so that air is normally prevented from passing from the main tank to the interlock conduit 68.

As a result of the opening of auxiliary control valves 51 or 52 or the closing of auxiliary control valve 75 and consequent closing of main valve 26, air pressure will be exhausted from the signal line through the exhaust port 31 of main valve 26, thus opening valve 97 to permit the interlock conduit 68 to be charged from the main tank 14. Pressure in the interlock conduit will in turn close control valves 36 of the remaining phases.

Although a particular valve has been described for charging the interlocking line upon a loss of pressure in the signal line, it will be understood of course that any suitable means responsive to a loss of pressure may be employed for this purpose.

Before switch 8 can be restored to open position it is necessary that the interlocking conduits be exhausted by manual or automatic means or by providing a slow leak. For purposes of illustration, slow leak valve 94 has been provided in the interlock conduit 68. The valve 97 which is opened by the low pressure signal must be reclosed. This can be done by admitting compressed air from the main tank to the diaphragm of valve device 97 with a reset mechanism similar to that used to reopen valve 26.

It is to be understood that in all of the above described embodiments of the invention, a similar electropneumatic system including the bypass switch actuating means and the reset system is provided for each phase of a three-phase line. A protective system has thus been provided for a three-phase series capacitor installation whereby a bypass switch is provided on each phase to bypass the capacitor upon the occurrence of certain predetermined abnormal conditions and whereby capacitors of all phases are bypassed regardless of the phase in which trouble originated. It should now be apparent that a protective system has been provided for series capacitors installed in high voltage transmission lines which provides rapid and effective protection against abnormal conditions which would be dangerous to the capacitor while at the same time protecting against unnecessary opening of the line circuit breakers due to an unbalance of the transmission line voltages when only one phase of a three-phase line is subjected to the aforementioned abnormal condition.

Certain specific embodiments of the invention have been shown and described for the purpose of illustration but it will be apparent that various modifications and other embodiments are possible within the scope of the invention. It is to be understood, therefor, that the invention is not limited to the specific detailed showing described but in its broadest aspects would include all equivalent embodiments and modifications which come within the scope of the invention.

I claim as my invention:

1. In a series capacitor installation for a three-phase alternating-current line having a capacitor adapted to be connected in series in one phase, having a second capacitor adapted to be connected in series in a second phase, having a third capacitor adapted to be connected in series in a third phase and having a protective system including a bypass switch connected across each of said capacitors; the improvement comprising an electropneumatic system on each phase for controlling said bypass switches, said electropneumatic system comprising a pneumatic cylinder device for actuating said bypass switch, a normally open first control valve for admitting and exhausting air to said cylinder device, said first control valve having pneumatic control means for closing said control valve and exhausting said cylinder, a conduit connecting said pneumatic control means on said first phase to said pneumatic control means on said second and third phases, a normally closed second control valve for admitting air to said conduit, said second control valve having pneumatic control means, and means responsive to predetermined abnormal conditions for operating said pneumatic control means on said first control valve and on said second control valve prior to closing of any of said bypass switches whereby operation of said electropneumatic system to close said bypass switch on said one phase operates the electropneumatic system to close said bypass switches on said second and third phases.

2. In a series capacitor installation for a three-phase alternating-current line having a capacitor adapted to be connected in series in one phase, having a second capacitor adapted to be connected in series in a second phase, having a third capacitor adapted to be connected in series in a third phase and having a protective system including a bypass switch connected across each of said capacitors; the improvement comprising an electropneumatic system on each phase for controlling said bypass switches, said electropneumatic system comprising a pneumatic cylinder device for actuating said bypass switch, a normally open first control valve for admitting and exhausting air to said cylinder device, said first control valve having pneumatic control means for closing said control valve and exhausting said cylinder, a conduit connecting said pneumatic control means on said first phase to said pneumatic control means on said second and third phases, a normally closed second control valve for admitting air to said conduit, said second control valve having pneumatic control means, means responsive to predetermined abnormal conditions for operating said pneumatic control means on said first control valve and on said second control valve prior to closing any of said bypass switches, a compressed air tank for providing air pressure for said pneumatic system, an auxiliary air reservoir interposed between said compressed air tank and said conduit on each phase, and check valve means for admitting air from said auxiliary air reservoir to said conduit whereby operation of said electropneumatic system to close said bypass switch on said one phase operates the electropneumatic system to close said bypass switches on said second and third phases.

3. In a series capacitor installation for a three-phase alternating-current line having a capacitor adapted to be connected in series in one phase, having a second capacitor adapted to be connected in series in a second phase, having a third capacitor adapted to be connected in series in a third phase and having a protective system including a bypass switch connected across each of said capacitors; the improvement comprising an electropneumatic system on each phase for controlling said bypass switches, said electropneumatic system comprising a pneumatic cylinder device for actuating said bypass switch, a normally open first control valve for admitting and exhausting air to said cylinder device, said first control valve having pneumatic control means for closing said control valve and exhausting said cylinder, a conduit connecting said pneumatic control means on said first phase to said pneumatic control means on said second and third phases, a normally closed second control valve for admitting air to said conduit, said second control valve having pneumatic control means, means responsive to predetermined abnormal conditions for operating said pneumatic control means on said first control valve and on said second control valve prior to closing of said bypass switch, a compressed air tank for providing air pressure for said pneumatic system, an auxiliary air reservoir interposed between said compressed air tank and said conduit on each phase to provide air pressure for said conduit, check valve means for admitting air from said auxiliary air reservoir to said conduit, pressure reducing means for holding said auxiliary reservoir in a precharged condition, said pressure releasing means and said second control valve connected in parallel and interposed between said compressed air tank and said auxiliary reservoir.

4. In a series capacitor installation for a polyphase alternating-current line having a capacitor adapted to be connected in series with each phase; a protective system including a bypass switch connected across each of said capacitors, spring biased to closed position, an electropneumatic system on each phase for controlling said bypass switches including a pneumatic cylinder connected to said bypass switch, valve means for admitting compressed air to said cylinder to normally hold said bypass switch in open position, pneumatic means responsive to air pressure for actuating said valve means, electrically actuated valve means on each phase responsive to predetermined abnormal conditions for admitting air to said pneumatic means, a conduit interconnecting said pneumatic means on all phases, means for maintaining said conduit free of compressed air to said conduit when all of said bypass switches are open and means for admitting compressed air to said conduit prior to closing of any of said bypass switches upon occurrence of one or more of said predetermined abnormal conditions, whereby operation of said electropneumatic system to close a bypass switch on one phase operates the electropneumatic system to close said bypass switches on the other phases.

References Cited in the file of this patent

UNITED STATES PATENTS

| | | |
|---|---|---|
| 2,144,503 | Marbury | Jan. 17, 1939 |
| 2,287,041 | Journeaux | June 23, 1942 |
| 2,450,628 | Boisseau | Oct. 5, 1948 |
| 2,576,132 | Marbury | Nov. 27, 1951 |
| 2,584,710 | Johnson | Feb. 5, 1952 |